Patented Jan. 8, 1946

2,392,660

UNITED STATES PATENT OFFICE 2,392,660

HORMONE DERIVATIVE

Gordon A. Grant, Montreal, Quebec, and Carl von Seemann, Westmount, Quebec, Canada No Drawing. Application July 19, 1944, Serial No. 545,740. In Canada August 20, 1943

10 Claims. (Cl. 260—239.5)

INTRODUCTION

This invention relates to new hormone derivatives and to their preparation and more particularly to derivatives of the cyclopentano phenanthrine series containing a hydroxyl group attached to the 17 carbon atom and a sulphate group attached to the 3 carbon atom, or salts thereof.

OBJECTS

It is a principal object of the invention to provide water-soluble hormone products having high oral activity. It is a further object of the invention to provide hydrogenation products of 17 keto steroid hormone sulphates.

With these and other objects in view, the applicants have found that hydrogenated sulphates possessing a 17 hydroxyl group can be prepared from 17 keto steroid oestrogenic sulphates and that these new products have high oral oestrogenic activity.

A preferred procedure for the conversion is catalytic hydrogenation in aqueous solution under neutral or mildly alkaline conditions in the presence of a suitable catalyst, preferably platinum oxide, at substantially normal temperature and hydrogen pressure. Surprisingly, under these conditions, the 3 mono-sulphate group remains attached to the nucleus and the yield of the hydrogenation products may be practically quantitative. The products can be isolated as water-soluble sodium salts or insoluble quinidine salts.

The reaction is characterized specifically by the conversion of sodium oestrone sulphate $C_{18}H_{21}O_5NaS$ to sodium oestradiol 3 mono-sulphate $C_{18}H_{23}O_5NaS$, which is represented by the following equation.

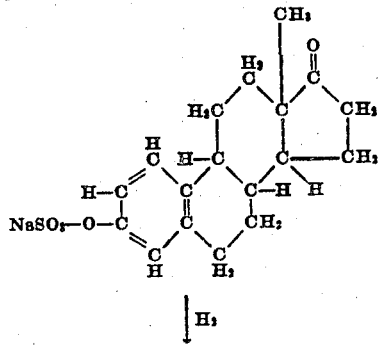

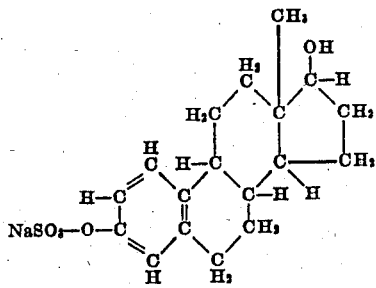

It should, however, be understood that these formulae are given merely as temporary assumptions and may later be shown to require modifications.

EXAMPLES

The following examples serve to illustrate the invention further but, of course, are not to be taken in a limiting sense.

Example 1

100 mg. sodium oestrone sulphate dissolved in 30 ml. M/5 phosphate buffer were hydrogenated at room temperature in the presence of 25 mg. platinum oxide catalyst (previously saturated with hydrogen at substantially normal pressure) until the equivalent of 2 atoms of hydrogen had been taken up. After separation of the catalyst, the solution was evaporated to dryness in vacuo at about 40° C. under nitrogen. The resulting dry residue was exhaustively extracted with absolute methanol at 40° C. and filtered. The filtrate was evaporated to dryness in vacuo under hydrogen and the above procedure was repeated several times. The final salt-free methanol solution was concentrated in vacuo under hydrogen to a small volume and precipitated with five volumes of ether. Sodium oestradiol sulphate separated instantly, was collected on a filter and dried in vacuo. The compound gave the following analysis:

S: 8.43%, oestradiol content 71% (Marrian-Kober test) $C_{18}H_{23}O_5SNa$ required 8.55% S and 72% oestradiol.

A portion of the hydrogenated compound was precipitated from aqueous solution by a solution containing 85 mg. quinidine sulphate in 20 ml. water. Quinidine oestradiol sulphate separated immediately and after standing for a time at —4° C. was collected on a filter, washed with ice-cold water and dried in vacuo. The yield was practically quantitative. The salt was found to be remarkably stable. Analysis gave the following figures:

S: 4.49%, N(Dumas 4.32%: $C_{18}H_{23}N_2O_4S$ requires: N 4.14%, S. 4.73%. Hydrolysis of the hydrogenated compound yielded oestradiol.

An aqueous solution of the sodium oestradiol 3 mono-sulphate was adjusted to a pH 1.9 by addition of HCl and hydrolyzed at 15 lbs. pressure for 45 minutes. Colourless, needle-shaped crystals of oestradiol separated, which were filtered after some standing at —4° C., washed with ice-cold water and dried in vacuo. The yield was practically quantitative, M. P. 169°–170° C. Upon recrystallization, the mixed melting point with an authentic sample of oestradiol (M. P. 175°) was 174° C. The sodium oestradiol 3 mono-sulphate was assayed by oral administration to the adult ovariectomized rat and found to possess a higher degree of oestrogenic activity than the unesterified oestradiol.

Example 2

200 mg. sodium oestrone sulphate dissolved in 40 ml. M/5 phosphate buffer were hydrogenated in the presence of 50 mg. platinum oxide catalyst previously saturated with hydrogen at substantially normal hydrogen pressure, until the theoretical amount of hydrogen had been taken up. After separation from the catalyst, the solution was evaporated to dryness in vacuo at about 40° C. under nitrogen. The dry residue was exhaustively extracted with absolute methanol, centrifuged, the supernatants decanted, the insoluble precipitates washed on the centrifuge with fresh absolute methanol, and the clear washings united to the supernatant obtained above. The combined methanolic extracts were concentrated in vacuo under nitrogen to a small volume, and precipitated with five volumes of ether. The precipitate was centrifuged. It was then re-extracted as above with fresh methanol and the above procedure of precipitation repeated several times until the precipitate of sodium oestradiol sulphate was completely free from buffer salts. This final precipitate was dissolved in 25 ml. absolute methanol and evaporated in vacuo under nitrogen to a volume of a few ml. and precipitated with five volumes of ether. A practically quantitative yield of sodium oestradiol sulphate was thus obtained.

A portion of the above methanolic solution was evaporated in dryness in vacuo under nitrogen. Upon acid hydrolysis in aqueous solution a practically quantitative yield of oestradiol was obtained, M. P. 164°–165° C. Upon re-crystallization, the material gave no depression with an authentic sample of oestradiol (M. P. 175° C.) when a mixed melting point was determined.

Example 3

A sample of a suitably purified preparation of the oestrogenic sulphates isolated from equine urine was hydrogenated substantially as in the preceding examples, in the presence of a platinum oxide catalyst, previously saturated with hydrogen. Acid hydrolysis of the hydrogenated products yielded oestradiol.

By way of the foregoing procedures, there are produced hydrogenation products of the 17 keto steroid oestrogenic sulphates, having high oral activity. The resulting products are more active than the non-conjugated hormones, as for instance, oestrone or oestradiol, when administered orally to the adult ovariectomized rat. Other advantages will appear to those skilled in the art.

It will be understood that, without departing from the spirit of the invention or the scope of the claims, various modifications may be made in the specific expedients described.

We claim:

1. As a new compound, sodium oestradiol 3 mono-sulphate.

2. As a new compound, quinidine oestradiol 3 mono-sulphate.

3. As a new compound, a salt of oestradiol 3 mono-sulphate.

4. A process of producing hydrogenated oestrogenic hormone sulphates, which comprises, subjecting an oestrogenic substance containing a 17 keto steroid 3 mono-sulphate to the action of catalytically activated hydrogen in an aqueous solution, whereby the sulphate group remains attached to the nucleus and the 17 keto group is reduced to a hydroxyl group.

5. A process of producing hydrogenated oestrogenic hormone sulphates, which comprises, subjecting an oestrogenic substance containing a 17 keto steroid 3 mono-sulphate to the action of catalytically activated hydrogen in a neutral or mildly alkaline aqueous solution, under substantially normal conditions of temperature and of hydrogen pressure, whereby the sulphate group remains attached to the nucleus and the 17 keto group is reduced to a hydroxyl group.

6. A process of producing hydrogenated hormone sulphates, which comprises, subjecting sodium oestrone sulphate to the action of catalytically activated hydrogen in an aqueous solution, whereby the sulphate group remains attached to the nucleus and the 17 keto group is reduced to a hydroxyl group.

7. A process of producing hydrogenated hormone sulphates, which comprises, subjecting sodium oestrone sulphate to the action of catalytically activated hydrogen in a neutral to mildly alkaline aqueous solution under substantially normal conditions of temperature and of hydrogen pressure, whereby the sulphate group remains attached to the nucleus and the 17 keto group is reduced to a hydroxyl group.

8. A process of producing hydrogenated oestrogenic sulphates, comprising, subjecting a preparation of a 17 keto steroid 3 mono-sulphate occurring in equine urine to the action of catalytically activated hydrogen in a neutral to mildly alkaline aqueous solution under substantially normal conditions of temperature and of hydrogen pressure, whereby the 17 keto group is converted to a 17 hydroxyl group, and the sulphate group remains attached to the nucleus.

9. A process, as claimed in claim 4, wherein the catalyst is platinum oxide.

10. A process of producing hydrogenated oestrogenic hormone sulphates, which comprises, subjecting a water-soluble substance containing a 17 keto steroid 3 mono-sulphate to the action of catalytically activated hydrogen in an aqueous solution whereby the sulphate group remains attached to the nucleus and the 17 keto group is reduced to a hydroxyl group, and converting the resulting product into a salt.

GORDON A. GRANT.
CARL von SEEMANN.